United States Patent
Zorgui et al.

(10) Patent No.: US 12,256,345 B2
(45) Date of Patent: Mar. 18, 2025

(54) RELAY OPERATION WITH ENERGY STATE MODES

(71) Applicant: QUALCOMM Incorporated, San Diego, CA (US)

(72) Inventors: Marwen Zorgui, San Diego, CA (US); Ahmed Elshafie, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/944,073

(22) Filed: Sep. 13, 2022

(65) Prior Publication Data

US 2024/0089875 A1    Mar. 14, 2024

(51) Int. Cl.
*H04W 52/46* (2009.01)
*H04W 64/00* (2009.01)
*H04W 74/00* (2009.01)

(52) U.S. Cl.
CPC ......... *H04W 52/46* (2013.01); *H04W 64/006* (2013.01); *H04W 74/002* (2013.01)

(58) Field of Classification Search
CPC ....... H04W 4/02; H04W 4/021; H04W 52/04; H04W 52/38; H04W 52/46; H04W 64/00; H04W 64/003; H04W 64/006; H04W 74/002
See application file for complete search history.

(56) References Cited

U.S. PATENT DOCUMENTS

| | | | |
|---|---|---|---|
| 8,150,311 B2 * | 4/2012 | Hart | H04W 52/46 455/7 |
| 8,798,525 B2 * | 8/2014 | Kazmi | H04W 52/46 455/67.11 |
| 2023/0109333 A1 * | 4/2023 | Park | H04W 40/246 370/254 |

FOREIGN PATENT DOCUMENTS

| | | |
|---|---|---|
| EP | 3010271 A1 | 4/2016 |
| WO | WO-2016182597 A1 | 11/2016 |

OTHER PUBLICATIONS

International Search Report and Written Opinion—PCT/US2023/072309—ISA/EPO—Dec. 20, 2023.

(Continued)

*Primary Examiner* — Quochien B Vuong
(74) *Attorney, Agent, or Firm* — Holland & Hart LLP

(57) ABSTRACT

Methods, systems, and devices for wireless communications are described. A relay device may detect that a network has transitioned from a first energy state mode to a second energy state mode and the second energy state mode may be associated with a reduced network coverage area relative to a network coverage area associated with the first energy state mode. The relay device may activate a relaying function at the relay device based on detecting that the network has transitioned to the second energy state mode and a location of the relay device with respect to the reduced network coverage area. The relay device may communicate with a user equipment (UE) and a network entity of the network to relay transmissions between the UE and the network entity based at least in part on activating the relaying function.

30 Claims, 13 Drawing Sheets

(56) References Cited

OTHER PUBLICATIONS

ZTE, et al., "Discussion on Relay Initiation and Discovery", 3GPP TSG RAN WG2 #91, R2-153765, 3rd Generation Partnership Project (3GPP), Mobile Competence Centre, 650, Route Des Lucioles, F-06921 Sophia-Antipolis Cedex, France, vol. RAN WG2, No. Beijing, China, Aug. 24, 2015-Aug. 28, 2015, Aug. 23, 2015, Aug. 15, 2015, XP051004411, XP050994093, 5 Pages, the whole document.

* cited by examiner

RELAY OPERATION WITH ENERGY STATE MODES

TECHNICAL FIELD

The following relates to wireless communications, including relay operation with energy state modes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a wireless device may engage in network energy saving operations. However, such approaches may be improved.

SUMMARY

The described techniques relate to improved methods, systems, devices, and apparatuses that support relay operation with energy state modes. A relay device may detect that a network has transitioned from a first energy state mode to a second energy state mode and the second energy state mode may be associated with a reduced network coverage area relative to a network coverage area associated with the first energy state mode. The relay device may activate a relaying function at the relay device based on detecting that the network has transitioned to the second energy state mode and a location of the relay device with respect to the reduced network coverage area. The relay device may communicate with a user equipment (UE) and a network entity of the network to relay transmissions between the UE and the network entity based at least in part on activating the relaying function.

A method for wireless communication at a relay device is described. The method may include detecting that a network has transitioned from a first energy state mode to a second energy state mode, where the second energy state mode is associated with a reduced network coverage area relative to a network coverage area associated with the first energy state mode, activating a relaying function at the relay device based on detecting that the network has transitioned to the second energy state mode and a location of the relay device with respect to the reduced network coverage area, and communicating with a user equipment (UE) and a network entity of the network to relay transmissions between the UE and the network entity based on activating the relaying function.

An apparatus for wireless communication at a relay device is described. The apparatus may include a processor, memory coupled with the processor, and instructions stored in the memory. The instructions may be executable by the processor to cause the apparatus to detect that a network has transitioned from a first energy state mode to a second energy state mode, where the second energy state mode is associated with a reduced network coverage area relative to a network coverage area associated with the first energy state mode, activate a relaying function at the relay device based on detecting that the network has transitioned to the second energy state mode and a location of the relay device with respect to the reduced network coverage area, and communicate with a UE and a network entity of the network to relay transmissions between the UE and the network entity based on activating the relaying function.

Another apparatus for wireless communication at a relay device is described. The apparatus may include means for detecting that a network has transitioned from a first energy state mode to a second energy state mode, where the second energy state mode is associated with a reduced network coverage area relative to a network coverage area associated with the first energy state mode, means for activating a relaying function at the relay device based on detecting that the network has transitioned to the second energy state mode and a location of the relay device with respect to the reduced network coverage area, and means for communicating with a UE and a network entity of the network to relay transmissions between the UE and the network entity based on activating the relaying function.

A non-transitory computer-readable medium storing code for wireless communication at a relay device is described. The code may include instructions executable by a processor to detect that a network has transitioned from a first energy state mode to a second energy state mode, where the second energy state mode is associated with a reduced network coverage area relative to a network coverage area associated with the first energy state mode, activate a relaying function at the relay device based on detecting that the network has transitioned to the second energy state mode and a location of the relay device with respect to the reduced network coverage area, and communicate with a UE and a network entity of the network to relay transmissions between the UE and the network entity based on activating the relaying function.

In some examples of the method, apparatuses, and non-transitory computer-readable medium described herein, detecting that the network may have transitioned from the first energy state mode to the second energy state mode may include operations, features, means, or instructions for receiving a control signal indicating the transition from the first energy state mode to the second energy state mode.

In some examples of the method, apparatuses, and non-transitory computer-readable medium described herein, the control signal includes one or more of a system information block, a master information block, or a message received over a backhaul link.

Some examples of the method, apparatuses, and non-transitory computer-readable medium described herein may further include operations, features, means, or instructions for transmitting an indication of the second energy state mode based on activating the relaying function.

Some examples of the method, apparatuses, and non-transitory computer-readable medium described herein may further include operations, features, means, or instructions for transmitting the indication of the second energy state mode in a sidelink synchronization signal block, a groupcast shared channel message, a sidelink control information message, a unicast medium access control control element, or a unicast radio resource control message.

Some examples of the method, apparatuses, and non-transitory computer-readable medium described herein may further include operations, features, means, or instructions for receiving an indication of one or more relay operation parameters associated with the relay device, the one or more relay operation parameters including a power level, an indication of one or more beams, or both and where communicating with the UE, the network entity, or both may be based on the one or more relay operation parameters.

In some examples of the method, apparatuses, and non-transitory computer-readable medium described herein, the relaying function may be activated at the relay device based on a distance between the relay device and the network entity.

Some examples of the method, apparatuses, and non-transitory computer-readable medium described herein may further include operations, features, means, or instructions for receiving a relay function activation message that indicates that the relay device may be to activate the relaying function and where activating the relaying function at the relay device based on receiving the relay function activation message.

Some examples of the method, apparatuses, and non-transitory computer-readable medium described herein may further include operations, features, means, or instructions for transmitting, to the network entity and based on detecting that the network may have transitioned from the first energy state mode to the second energy state mode, a relay availability message that indicates that the relay device may be available to act as a relay and that a distance between the relay device and the network entity satisfies a distance threshold.

Some examples of the method, apparatuses, and non-transitory computer-readable medium described herein may further include operations, features, means, or instructions for transmitting, to the UE and based on detecting that the network may have transitioned from the first energy state mode to the second energy state mode, a relay availability message that indicates that the relay device may be available to act as a relay.

Some examples of the method, apparatuses, and non-transitory computer-readable medium described herein may further include operations, features, means, or instructions for receiving, from the UE, a request for an indication of a current energy state mode and transmitting, to the UE, an indication of the second energy state mode.

A method for wireless communication at a network entity of a network is described. The method may include detecting that the network has transitioned from a first energy state mode to a second energy state mode, where the second energy state mode is associated with a reduced network coverage area relative to a network coverage area of the first energy state mode, determining, based on a location of a relay device with respect to the reduced network coverage area, that the relay device has activated a relaying function, and communicating with a UE via the relay device based on the determining.

An apparatus for wireless communication at a network entity of a network is described. The apparatus may include a processor, memory coupled with the processor, and instructions stored in the memory. The instructions may be executable by the processor to cause the apparatus to detect that the network has transitioned from a first energy state mode to a second energy state mode, where the second energy state mode is associated with a reduced network coverage area relative to a network coverage area of the first energy state mode, determine, based on a location of a relay device with respect to the reduced network coverage area, that the relay device has activated a relaying function, and communicate with a UE via the relay device based on the determining.

Another apparatus for wireless communication at a network entity of a network is described. The apparatus may include means for detecting that the network has transitioned from a first energy state mode to a second energy state mode, where the second energy state mode is associated with a reduced network coverage area relative to a network coverage area of the first energy state mode, means for determining, based on a location of a relay device with respect to the reduced network coverage area, that the relay device has activated a relaying function, and means for communicating with a UE via the relay device based on the determining.

A non-transitory computer-readable medium storing code for wireless communication at a network entity of a network is described. The code may include instructions executable by a processor to detect that the network has transitioned from a first energy state mode to a second energy state mode, where the second energy state mode is associated with a reduced network coverage area relative to a network coverage area of the first energy state mode, determine, based on a location of a relay device with respect to the reduced network coverage area, that the relay device has activated a relaying function, and communicate with a UE via the relay device based on the determining.

Some examples of the method, apparatuses, and non-transitory computer-readable medium described herein may further include operations, features, means, or instructions for transmitting a control signal indicating the transition from the first energy state mode to the second energy state mode.

In some examples of the method, apparatuses, and non-transitory computer-readable medium described herein, the control signal includes one or more of a system information block, a master information block, or a message transmitted over a backhaul link.

Some examples of the method, apparatuses, and non-transitory computer-readable medium described herein may further include operations, features, means, or instructions for transmitting an indication of one or more relay operation parameters associated with the relay device, the one or more relay operation parameters including a power level, an indication of one or more beams, or both.

In some examples of the method, apparatuses, and non-transitory computer-readable medium described herein, the relaying function may be activated at the relay device based on a distance between the relay device and the network entity.

Some examples of the method, apparatuses, and non-transitory computer-readable medium described herein may further include operations, features, means, or instructions for transmitting a relay function activation message that indicates that the relay device may be to activate the relaying function and where the relay device activates the relaying function based on the relay function activation message.

Some examples of the method, apparatuses, and non-transitory computer-readable medium described herein may further include operations, features, means, or instructions for receiving, from the relay device, a relay availability message that indicates that the relay device may be available to act as a relay and that a distance between the relay device and the network entity satisfies a distance threshold.

DETAILED DESCRIPTION

During wireless communications, network entities (e.g., base stations) may consume significant amounts of power. As such, network energy saving features may aid in reducing such power consumption. For example, a network entity may communicate using different modes that may be associated with different levels of power consumption due to different operation configurations (e.g., turning off a radio frequency (RF) transmission chain, reducing a quantity of antennas for communications, or other operation modes). Such modes of operation for power conservation may be referred to as network energy saving network energy saving modes. Network entities may be capable of utilizing network energy saving modes with varying characteristics and power savings. However, the use of such network energy saving modes may reduce coverage areas, and a user equipment (UE) may fall outside of such a reduced coverage area. As used herein, a coverage area of a device (e.g., a network entity) may refer to a geographical area in which one or more other wireless devices (e.g., UEs) may be served by or communicate with the device.

A wireless device (e.g., another network entity, a UE, or other device) may operate as a relay device for a UE that falls outside of a reduced coverage area that results from the use of an network energy saving mode. The relay device may begin operation as such as a function of the network energy saving mode of the network. In some examples, the relay device may autonomously determine or detect a change in energy saving modes and begin operation as a relay device. In other examples, a network entity may instruct the relay device to begin such operation. In some examples, the relay device may broadcast the energy saving mode, a capability or availability indication for operating as a relay, or both, to the network entity, the UE, or both to facilitate relayed communications. Operation of a device as a relay may be selected or activated based on one or more factors, including a distance of the relay from the network entity. A relay device may further receive one or more parameters for relay operation (e.g., power levels, beam selections, or other parameters) that the network may select to coordinate relay operations and reduce interference. In these ways, energy savings at network entities may be increased through the use of energy saving modes while maintaining communications with devices falling outside of a resulting reduced coverage area.

Aspects of the disclosure are initially described in the context of wireless communications systems. Aspects of the disclosure are then described with reference to a wireless communications system and a process flow. Aspects of the disclosure are further illustrated by and described with reference to apparatus diagrams, system diagrams, and flowcharts that relate to relay operation with energy state modes.

Figure 1:
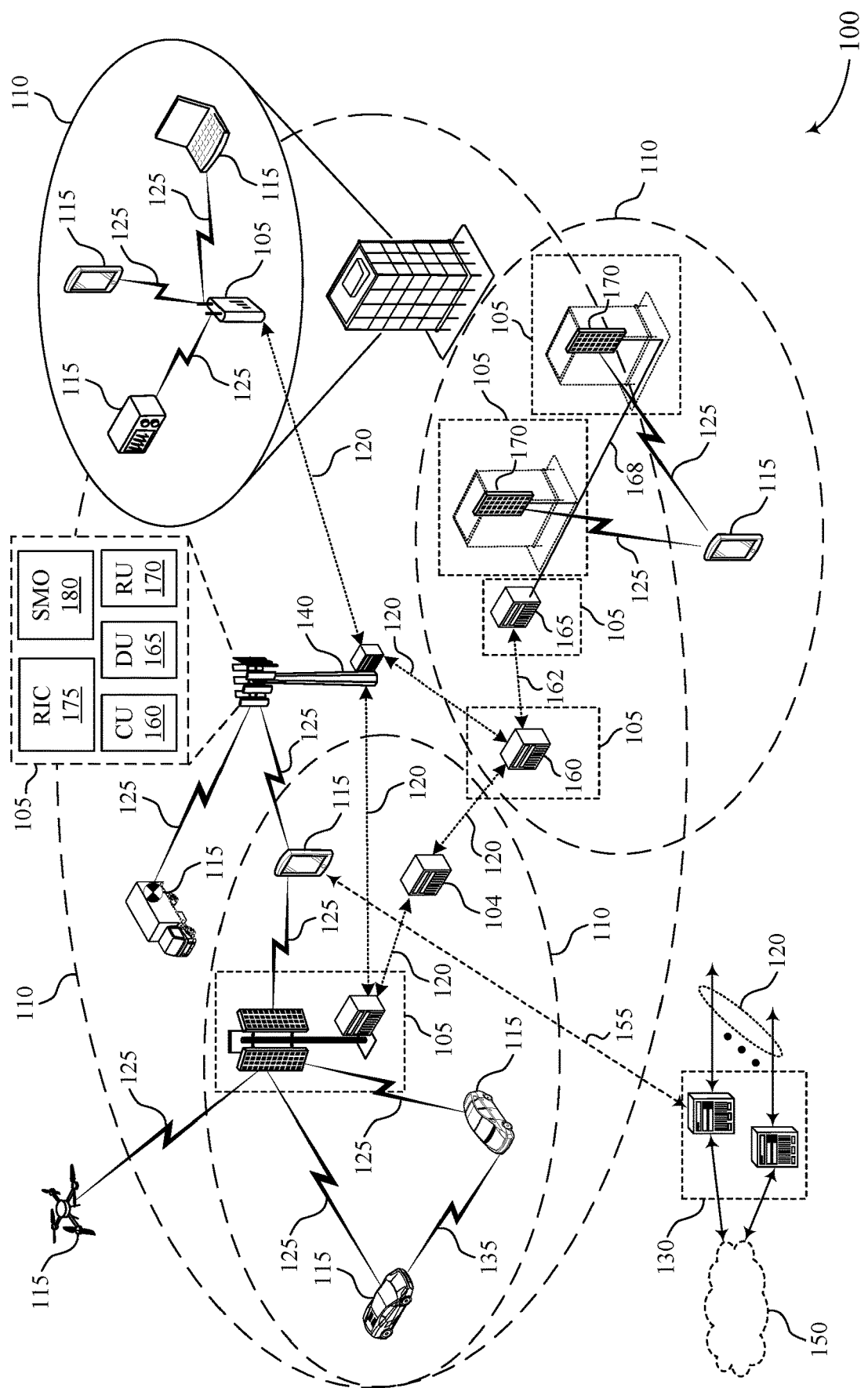
FIG. 1 illustrates an example of a wireless communications system that supports relay operation with energy state modes in accordance with one or more aspects of the present disclosure.

FIG. 1 illustrates an example of a wireless communications system 100 that supports relay operation with energy state modes in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support relay operation with energy state modes as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device) a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), etc., and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO)

communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, a relay device (which may be a UE 115, a network entity 105, or other wireless device) may be used to relay communications between a network entity 105 and a UE 115 in situations in which the network (e.g., one or more devices operating in the network, such as the network entity 105) is operating in a network energy saving mode (which may also be referred to as an energy state mode) with reduced power consumption and a reduced coverage area. In such a situation, a UE 115 may have been in a coverage area of the network entity 105 before the network entered the network energy saving mode but, due to the reduction in the coverage area associated with the network energy saving mode, is now located outside of that reduced coverage area. Thus, the relay device may detect that the network (e.g., the network entity 105 or other wireless device of the network) has entered into the network energy saving mode with a reduced coverage area. The relay device may activate a relaying function for relaying communications between the network entity 105 and the UE 115 that is located outside of the reduced coverage area.

Figure 2:
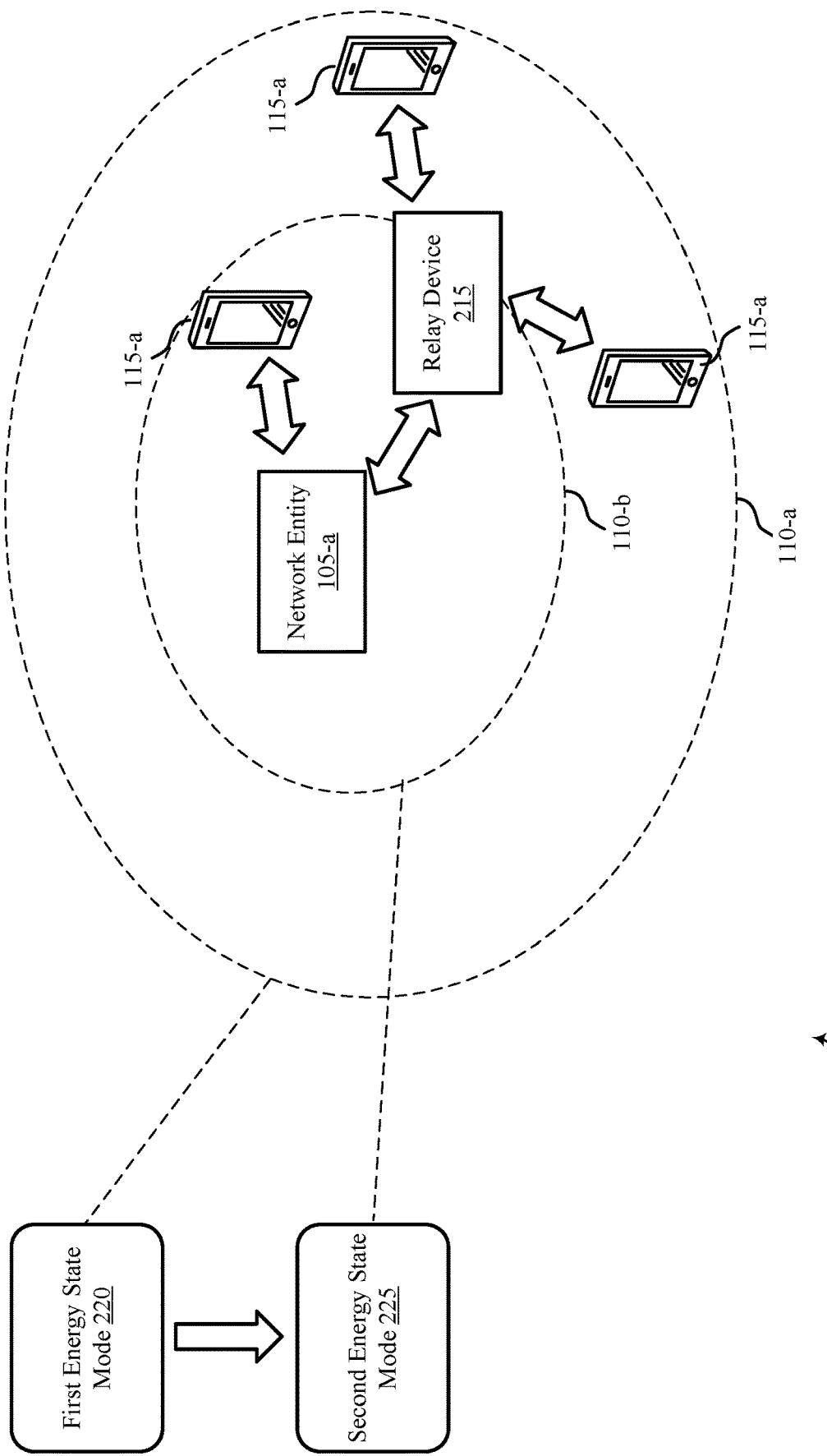
FIG. 2 illustrates an example of a wireless communications system that supports relay operation with energy state modes in accordance with one or more aspects of the present disclosure.

FIG. 2 illustrates an example of a wireless communications system 200 that supports relay operation with energy state modes in accordance with one or more aspects of the present disclosure. The wireless communications system 200 may include a network entity 105-a, which may be an example of one or more network entities as discussed in relation to other figures. The wireless communications system 200 also may include a relay device 215, which may be an example of a relay device as discussed in relation to other figures. The wireless communications system 200 also may include a UE 115-a, which may be an example of UEs discussed in relation to other figures.

In the course of operations, the wireless communications system 200 may engage in power saving operations that may be performed at one or more network devices. Significant amounts of power may be used to operate the wireless communications system 200 and, as such, network power saving operations may be employed to increase adoption and expansion of wireless communication networks.

Network power saving operations may employ different modes and operations to save power while maintaining network operation and the network may switch between different network energy saving modes according to the network input and the current traffic conditions. For example, with low amounts of traffic, the network entity 105-a may not activate all antennas of the network entity. Additionally, or alternatively, different network energy saving modes may include adapting a bandwidth used for communications, a quantity of active antennas, one or more other communication parameters, or any combination thereof.

In some examples, a network energy saving mode may be a sleep mode or a mode associated with reduced power consumption. Such network energy saving sleep modes may be different from one another in terms of operation, triggering conditions or messages (e.g., a reduced amount of traffic, such as traffic falling beneath a threshold), or both. For example, some sleep modes may turn off the radio frequency chains while others may not. Further, different sleep modes may have different amounts of power consumption and may employ different transition times (e.g., time periods for transitioning into the sleep mode and out of the sleep mode).

In some examples, a semi-static approach for network operation may be employed in which different network energy saving modes may be employed, optionally on a periodic basis. A network energy saving mode (also referred to as an energy state mode) may refer to a mode of operation in which one or more power saving operations are performed by which the network saves energy. A network energy saving mode may also be a flexible mode that may employ different power savings operations that may further be dynamically indicated by the network (e.g., depending on the current traffic conditions). Yet another network energy saving mode may be a "legacy" mode which may be associated with only some or no power savings operations.

During the course of operation, as the network operates in the different network energy saving modes, different communication parameters associated with the network energy saving modes may be adjusted. For example, the network entity 105-a may adjust a quantity of transmission antennas, reception antennas, transmit power, one or more other communication parameters, or any combination thereof, which may affect the coverage area associated with the network entity 105-a. For example, the network entity 105-a may operate in the first energy state mode 220 that may be associated with a first coverage area 110-a. The network entity 105-a may transition to the second energy state mode 225 that may be associated with a second coverage area 110-b. As such, UEs 115-a that are located within the first coverage area 110-a may not be located within the second coverage area 110-b, while the relay device 215 may be located within the second coverage area 110-b. As such, and as described herein, the relay device 215 (which may be a network entity, a UE, a dedicated relay device, or other wireless communications device) may operate as a relay point to relay communications between the UEs 115-*a* and the network entity 105-*a*.

In some examples, the network entity 105-*a* may assign one or more wireless devices (e.g., UEs, amplify-and-forward (AF) or decode-and-forward (DF) relays or repeaters, integrated access and backhaul (IAB) devices, reconfigurable intelligent metasurfaces (RISs), one or more other wireless devices, or any combination thereof to act as relays for devices (e.g., UEs 115-*a*) in one or more network energy saving modes. Such devices may be referred to herein as relay devices, such as relay device 215.

In some examples, the relay device 215 may be autonomously activated as relays depending on the network energy saving mode. For example, the relay device 215 may detect that the network or the network entity 105-*a* has transitioned to a network energy saving that is associated with one or more power saving operations, the second coverage area 110-*b* (e.g., that is used as a result of the power saving operations), or both. The relay device 215 may then autonomously activate as a relay to relay communications between the network entity 105-*a* and the UEs 115-*a*.

In some examples, the network entity 105-*a* may transmit an indication to the relay device 215 that the relay device 215 is to act as a relay, that the network is operating or will operate in a different network energy saving mode, or both. The network entity 105-*a* NW may communicate such an indication through a direct link (e.g., through a backhaul link) or through a broadcast signal or a dedicated over the air (OTA) signal (e.g., which the relay device 215 may decode to receive the indication of the network energy saving mode change). In some examples, such an indication may be part of a system information message broadcast.

In some examples, activation of the relay device 215 to operate as a relay may be associated with the network energy saving mode indication or communication state change indication associated with the network energy saving mode change (e.g., once an energy state is indicated or identified in signaling, such as synchronization signal block (SSB) signaling, downlink control information (DCI), RRC signaling, medium access control control element (MAC-CE) signaling, other signaling, or any combination thereof). In some examples, an indication activating the relay device 215 as a relay may be transmitted in different types of signaling, including L1 signaling (e.g., DCI), L2 signaling (e.g., MAC-CE), L3 signaling (e.g., RRC), or any combination thereof.

In some examples, the network entity 105-*a* may activate the relay device 215 to act as a relay in accordance with one or more communication parameters, such as a transmit power (e.g., specifying one or more power levels that the relay device 215 should use for communications with the UEs 115-*a* that are out of coverage). Such a power indication may be indicated through L1 signaling (e.g., DCI), L2 signaling (e.g., MAC-CE), L3 signaling (e.g., RRC), or any combination thereof.

The network entity 105-*a* may activate the relay device 215 to act as a relay in accordance with one or more beam parameters (e.g., specifying one or more beams that the relay device 215 is to use for communications with the UEs 115-*a* that are out of coverage). Such a beam indication may be indicated through L1 signaling (e.g., DCI), L2 signaling (e.g., MAC-CE), L3 signaling (e.g., RRC), or any combination thereof. The one or more beams to be used by the relay device 215 may be determined based on positioning of the relay device 215 or of multiple relay devices 215. For example, the network entity 105-*a* may coordinate beam parameters for one or more relay devices 215, such as by restricting the beams to be used for relay operations into one or more directions or disallowing use of some beams. Such coordination may be helpful for reducing, avoiding, or managing inter-cell interference.

In some examples, one or more relay devices 215 may be used for relaying transmissions and the relay devices 215 may be deployed or activated such that they are placed at or near (e.g., within a threshold distance or within a threshold signal strength) the end of coverage of the network entity 105-*a*. For example, the relay device 215 may be located at or near an edge of the second coverage area 110-*b*.

In some examples, the relay device 215 may transmit an indication of the current network energy saving mode being employed by the network entity 105-*a*. For example, the relay device 215 may transmit an indication of the second energy state mode 225 while acting as a relay and may transmit the indication through L1 signaling (e.g., DCI), L2 signaling (e.g., MAC-CE), L3 signaling (e.g., RRC), or any combination thereof). In some examples involving sidelink communications, the relay device 215 may transmit signaling such as sidelink control information (SCI), LTE-vehicle to everything (V2X) (PC5) MAC-CE signaling, PC5-RRC signaling, physical sidelink shared channel (PSSCH) groupcast signaling, PSSCH unicast signaling, dedicated relay operation signaling, sidelink SSB signaling, or any combination thereof. In this way, out of coverage devices, such as the UEs 115-*a*, may be apprised of the current network energy saving mode.

In some examples, different devices may act as a relay device 215 based on an network energy saving mode. For example, if the network entity 105-*a* transmits an indication of operation in the second energy state mode 225, the relay device 215 may be activated as a relay, whereas if the network entity 105-*a* transmits an indication of operation in the first energy state mode 220, a UE 115-*a* may be activated to serve as a relay device.

In some examples, the network entity 105-*a* may activate one or more UEs to act as a relay to communicate with out of coverage devices. In some examples, the network entity 105-*a* may do so in association with some network energy saving modes and not with other network energy saving modes. Activating one or more UEs as relays may allow additional flexibility, in that dedicated, stationary relay units may not be needed and UEs may be activated as relay devices on demand when needed (e.g., based on a level of traffic or whether the level of traffic exceeds or does not exceed a threshold). In some examples, the network entity 105-*a* may activate one or more UEs as relays based on the network energy saving mode, the distance of the UE to the serving gNB, one or more other characteristics or parameters, or any combination thereof. The distance may be obtained through different techniques, including a positioning estimate, a reference signal received power (RSRP) estimate, receiving an indication of an explicit location (e.g., an absolute position or a position relative to the network entity 105-*a*), or any combination thereof.

In some examples, the network entity 105-*a* may transmit a configuration that the relay device 215 is to apply for communications with the out of coverage devices. The configuration may include one or more indications of power, beams, other parameters, or any combination thereof that the relay device 215 is to use for relay operations.

In some examples, the UE may be activated as a relay device 215 in an autonomous manner (e.g., subject to decoding or detecting the network energy saving mode or a transition between network energy saving modes, the distance between the network entity 105-*a* and the relay device 215, or both). In other examples, a UE receive a command from the network entity 105-*a* to act as the relay device 215. For example, if one or more conditions (e.g., the network entity 105-*a* is using an network energy saving mode in which relaying may be appropriate, the distance between the network entity 105-*a* and the UE, or both) are satisfied, the network entity 105-*a* may activate the UE to act as the relay device 215 by transmitting an indication to the UE. Such an approach may allow the network entity 105-*a* to control interference and adaptively activate UE relays depending on the density of available UEs. In some examples, conditions for activation (e.g., at the UE, the network entity 105-*a*, other devices, or any combination thereof) may be configured or dynamically designated in signaling (e.g., L1 signaling (e.g., DCI), L2 signaling (e.g., MAC-CE), L3 signaling (e.g., RRC), or any combination thereof).

In some examples, the network entity 105-*a* may determine or estimate a set of UEs that may act as relay devices 215 based on an network energy saving mode (e.g., a current network energy saving mode or a future network energy saving mode), the distances of the UEs from the network entity 105-*a*, or both. As described herein, the network entity 105-*a* may receive an indication of a distance of a UE or may estimate or calculate a distance of the UE. Additionally, or alternatively, the network entity 105-*a* may employ other metrics to determine whether a UE is a candidate for relay operation (e.g., RSRP meeting or exceeding a threshold RSRP).

In some examples, the network entity 105-*a* may request that one or more UEs signal availability to act as a relay for network operations associated with a current or future network energy saving mode. For example, the network entity 105-*a* may request availability of the UEs 115-*a* to act as relays based on the transition from the first energy state mode 220 to the second energy state mode 225. The network entity 105-*a* may then activate one or more (or none) of the UEs 115-*a* depending on the availability responses and whether the individual UEs 115-*a* satisfy a distance threshold for relay operation. In some examples, such a distance threshold may be specified or dynamically indicated by the network entity 105-*a* or other network device.

In some examples, if a UE is acting as a relay device 215 and is serving another UE (e.g., one of the UEs 115-*a*), the UE acting as the relay device 215 may receive instructions to continue relaying communications even if the network entity 105-*a* transitions to another network energy saving mode, if a distance condition is not satisfied, or both.

In some examples, a UE acting as a relay device 215 may transmit (e.g., "advertise") its capability or actual operation as a relay based on a current or future network energy saving mode and, optionally, satisfying a distance condition. In this way, other UEs (such as out of coverage UEs such as the UEs 115-*a*) may prioritize or manage a relaying technique or strategy (e.g., by selecting between available relay devices 215). In some examples, the UE acting as the relay device 215 may broadcast a current or future network energy saving mode in which the network entity 105-*a* is operating as part of a SL-SSB transmission. Additionally, or alternatively, the UE acting as the relay device 215 may transmit a groupcast PSSCH to broadcast the current or future network energy saving mode. In other cases, the UE acting as the relay device 215 may transmit a SCI transmission (e.g., an SCI transmission that may not be decoded by all surrounding UEs). Further, the UE acting as the relay device 215 may transmit MAC-CE signaling, RRC signaling, or both, may be employed to transmit the indication of the current or future network energy saving mode. If, however, a UE that is out of coverage does not detect or receive a broadcast of an network energy saving mode, the UE may request an indication of the current or future network energy saving mode from the relay device 215.

In this way, the network entity 105-*a* may communicate with the UEs 115-*a* while still employing network energy saving modes to reduce power consumption by relaying communications through the relay device 215, even though the UEs 115-*a* fall outside of the second coverage area 110-*b* associated with the second energy state mode 225.

Figure 3:
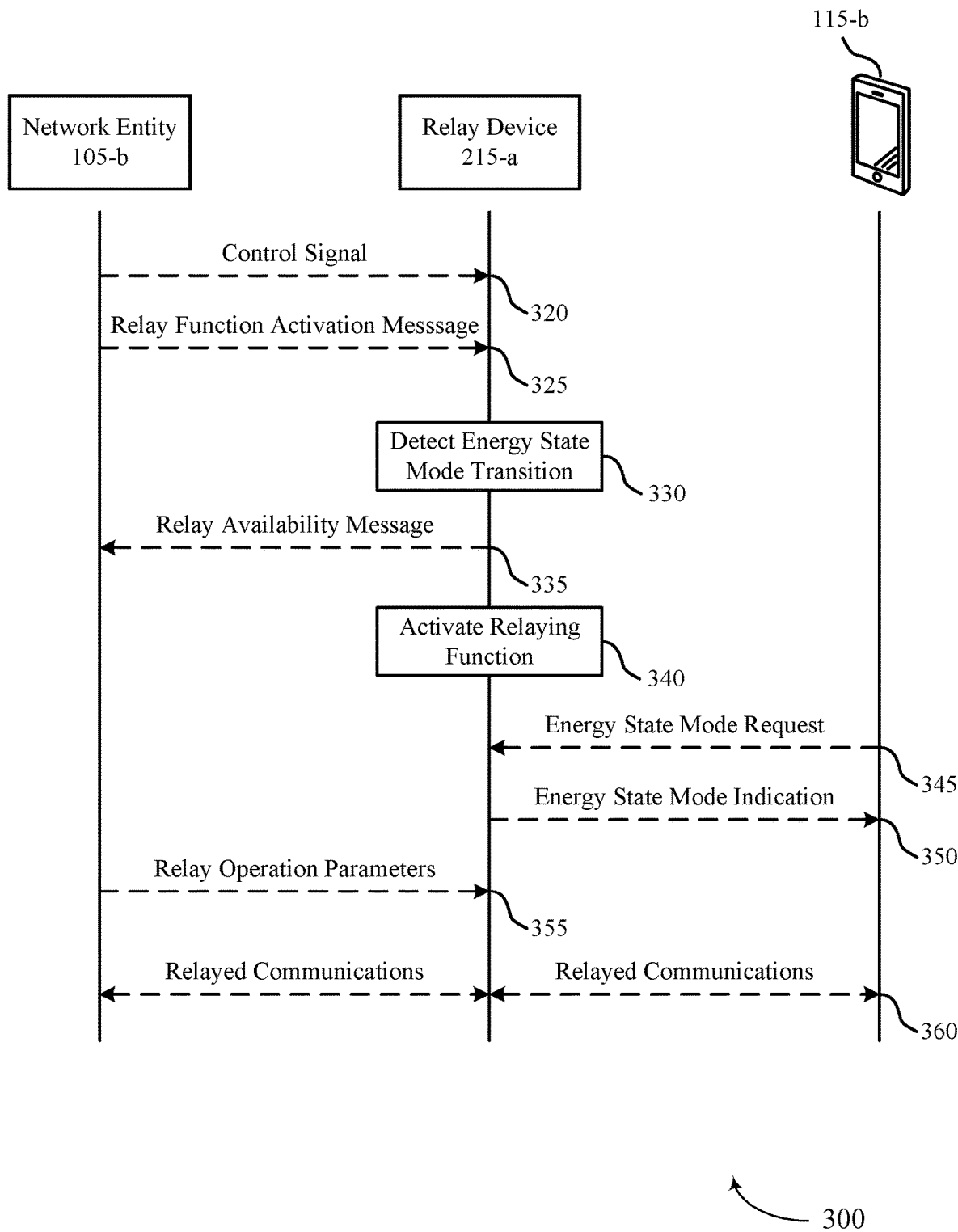
FIG. 3 illustrates an example of a process flow that supports relay operation with energy state modes in accordance with one or more aspects of the present disclosure.

FIG. 3 illustrates an example of a process flow 300 that supports relay operation with energy state modes in accordance with one or more aspects of the present disclosure. The process flow 300 may implement various aspects of the present disclosure described herein. The elements described in the process flow 300 (e.g., a network entity 105-*b*, a relay device 215-*a*, and a UE 115-*b*) may be examples of similarly-named elements described herein.

In the following description of the process flow 300, the operations between the various entities or elements may be performed in different orders or at different times. Some operations may also be left out of the process flow 300, or other operations may be added. Although the various entities or elements are shown performing the operations of the process flow 300, some aspects of some operations may also be performed by other entities or elements of the process flow 300 or by entities or elements that are not depicted in the process flow, or any combination thereof.

At 320, the relay device 215-*a* may receive a control signal that may indicate the transition from the first energy state mode to the second energy state mode. In some examples, the control signal may include one or more of a system information block, a master information block, or a message received over a backhaul link.

At 325, the relay device 215-*a* may receive a relay function activation message that may indicate that the relay device is to activate the relaying function.

At 330, the relay device 215-*a* may detect that a network has transitioned from a first energy state mode to a second energy state mode and the second energy state mode may be associated with a reduced network coverage area relative to a network coverage area associated with the first energy state mode.

At 335, the relay device 215-*a* may transmit, to the network entity and based at least in part on detecting that the network has transitioned from the first energy state mode to the second energy state mode, a relay availability message that indicates that the relay device is available to act as a relay and that a distance between the relay device and the network entity satisfies a distance threshold. Additionally, or alternatively, the relay device 215-*a* may transmit to the UE and based at least in part on detecting that the network has transitioned from the first energy state mode to the second energy state mode, a relay availability message that indicates that the relay device is available to act as a relay.

At 340, the relay device 215-*a* may activate a relaying function at the relay device based at least in part on detecting that the network has transitioned to the second energy state mode and a location of the relay device with respect to the reduced network coverage area. In some examples, the relaying function may be activated at the relay device based at least in part on a distance between the relay device and the network entity. In some examples, activating the relaying function at the relay device based at least in part on receiving the relay function activation message.

At 345, the relay device 215-*a* may receive, from the UE, a request for an indication of a current energy state mode.

At 350, the relay device 215-*a* may transmit an indication of the second energy state mode based at least in part on activating the relaying function. In some examples, the relay device 215-*a* may transmit the indication of the second energy state mode in a sidelink synchronization signal block, a groupcast shared channel message, a sidelink control information message, a unicast medium access control control element, or a unicast radio resource control message. In some examples, the relay device 215-*a* may transmit, to the UE, an indication of the second energy state mode.

At 355, the relay device 215-*a* may receive an indication of one or more relay operation parameters associated with the relay device, the one or more relay operation parameters including a power level, an indication of one or more beams, or both.

At 360, the relay device 215-*a* may communicate with the UE 215-*b* and the network entity 105-*b* of the network to relay transmissions between the UE 215-*b* and the network entity 105-*b* based at least in part on activating the relaying function. In some examples, communicating with the UE, the network entity, or both may be based at least in part on the one or more relay operation parameters.

Figure 4:
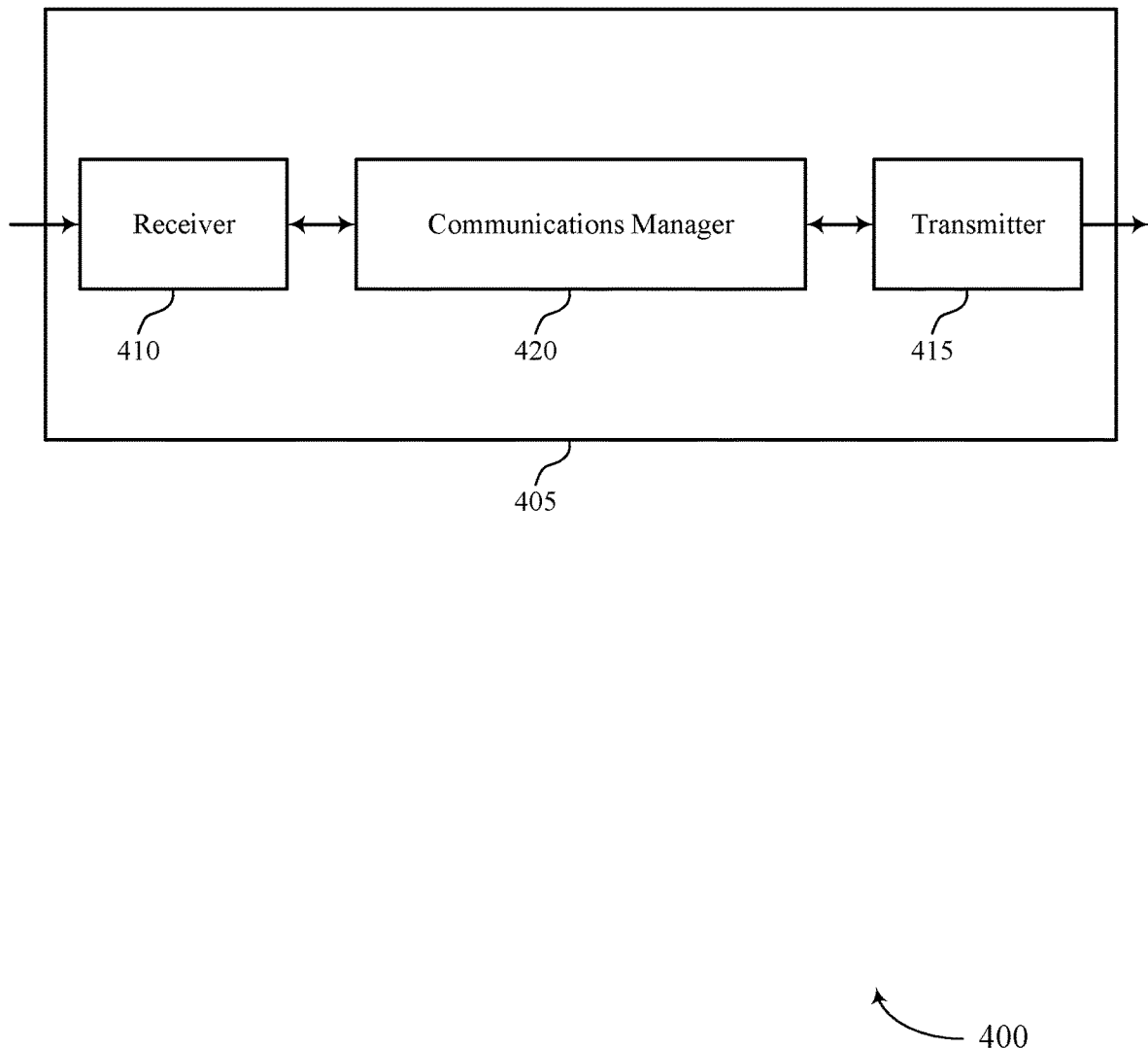
FIGS. 4 and 5 show block diagrams of devices that support relay operation with energy state modes in accordance with one or more aspects of the present disclosure.

FIG. 4 shows a block diagram 400 of a device 405 that supports relay operation with energy state modes in accordance with one or more aspects of the present disclosure. The device 405 may be an example of aspects of a relay device as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to relay operation with energy state modes). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to relay operation with energy state modes). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of relay operation with energy state modes as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, a CPU, a graphics processing unit (GPU). an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software) executed by a processor. If implemented in code executed by a processor, the functions of the communications manager 420, the receiver 410, the transmitter 415, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

Additionally, or alternatively, the communications manager 420 may support wireless communication at a relay device in accordance with examples as disclosed herein. For example, the communications manager 420 may be configured as or otherwise support a means for detecting that a network has transitioned from a first energy state mode to a second energy state mode, where the second energy state mode is associated with a reduced network coverage area relative to a network coverage area associated with the first energy state mode. The communications manager 420 may be configured as or otherwise support a means for activating a relaying function at the relay device based on detecting that the network has transitioned to the second energy state mode and a location of the relay device with respect to the reduced network coverage area. The communications manager 420 may be configured as or otherwise support a means for communicating with a UE and a network entity of the network to relay transmissions between the UE and the network entity based on activating the relaying function.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced processing, reduced power consumption, more efficient utilization of communication resources, or any combination thereof.

Figure 5:
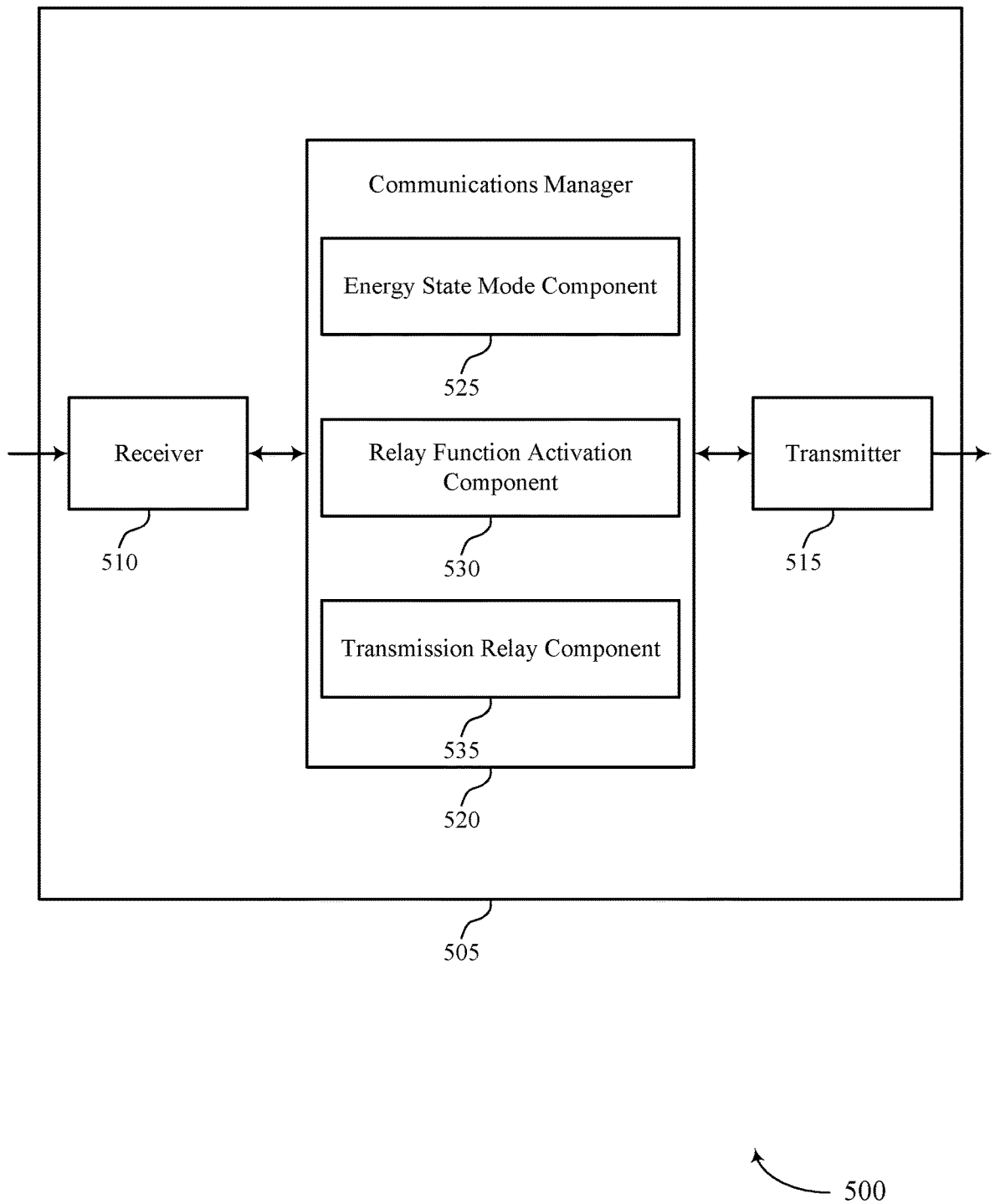

FIG. 5 shows a block diagram 500 of a device 505 that supports relay operation with energy state modes in accordance with one or more aspects of the present disclosure. The device 505 may be an example of aspects of a device 405 or a relay device 215 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to relay operation with energy state modes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to relay operation with energy state modes). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of relay operation with energy state modes as described herein. For example, the communications manager 520 may include an energy state mode component 525, a relay function activation component 530, a transmission relay component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a relay device in accordance with examples as disclosed herein. The energy state mode component 525 may be configured as or otherwise support a means for detecting that a network has transitioned from a first energy state mode to a second energy state mode, where the second energy state mode is associated with a reduced network coverage area relative to a network coverage area associated with the first energy state mode. The relay function activation component 530 may be configured as or otherwise support a means for activating a relaying function at the relay device based on detecting that the network has transitioned to the second energy state mode and a location of the relay device with respect to the reduced network coverage area. The transmission relay component 535 may be configured as or otherwise support a means for communicating with a UE and a network entity of the network to relay transmissions between the UE and the network entity based on activating the relaying function.

Figure 6:
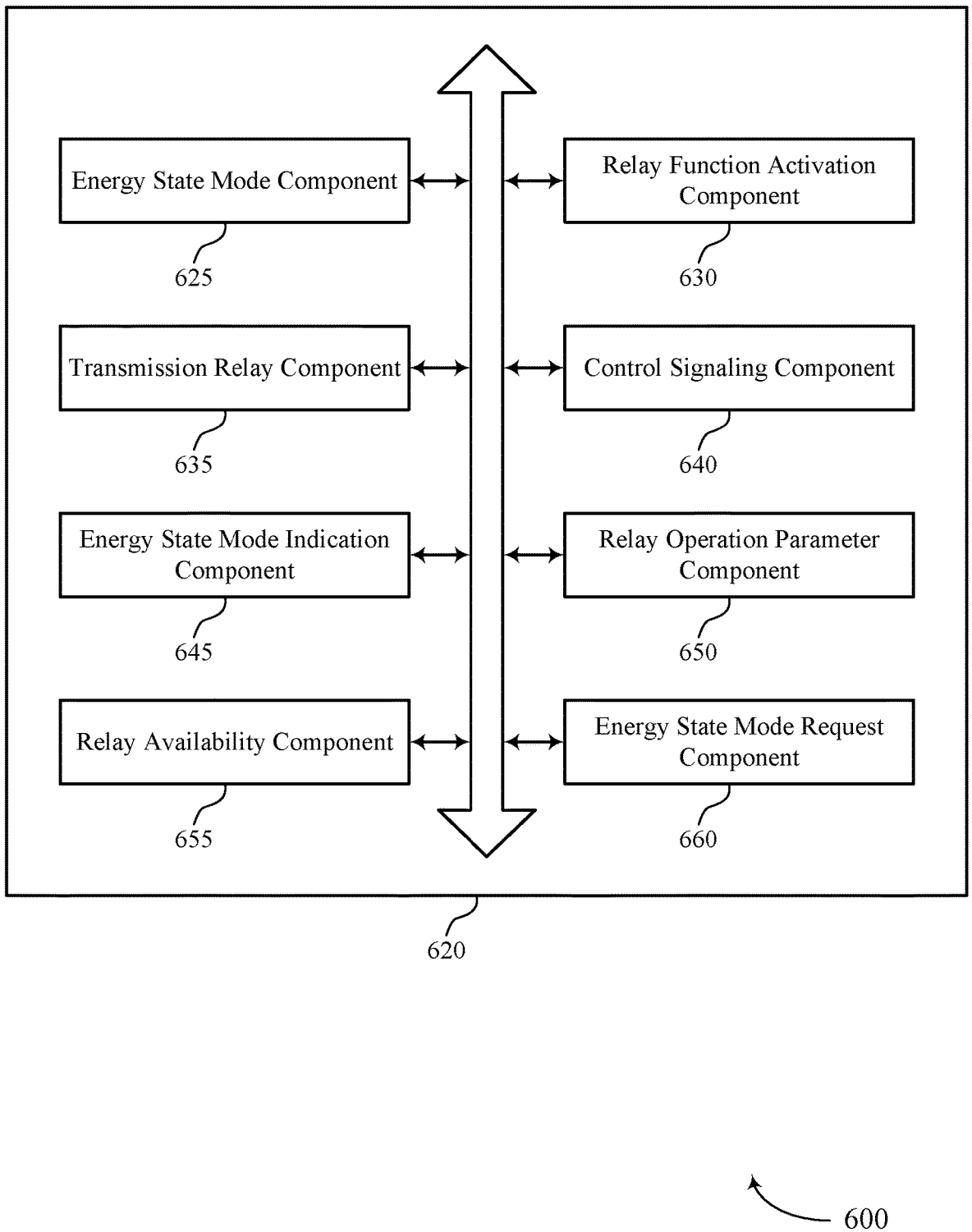
FIG. 6 shows a block diagram of a communications manager that supports relay operation with energy state modes in accordance with one or more aspects of the present disclosure.

FIG. 6 shows a block diagram 600 of a communications manager 620 that supports relay operation with energy state modes in accordance with one or more aspects of the present disclosure. The communications manager 620 may be an example of aspects of a communications manager 420, a communications manager 520, or both, as described herein. The communications manager 620, or various components thereof, may be an example of means for performing various aspects of relay operation with energy state modes as described herein. For example, the communications manager 620 may include an energy state mode component 625, a relay function activation component 630, a transmission relay component 635, a control signaling component 640, an energy state mode indication component 645, a relay operation parameter component 650, a relay availability component 655, an energy state mode request component 660, or any combination thereof. Each of these components may communicate, directly or indirectly, with one another (e.g., via one or more buses).

Additionally, or alternatively, the communications manager 620 may support wireless communication at a relay device in accordance with examples as disclosed herein. The energy state mode component 625 may be configured as or otherwise support a means for detecting that a network has transitioned from a first energy state mode to a second energy state mode, where the second energy state mode is associated with a reduced network coverage area relative to a network coverage area associated with the first energy state mode. The relay function activation component 630 may be configured as or otherwise support a means for activating a relaying function at the relay device based on detecting that the network has transitioned to the second energy state mode and a location of the relay device with respect to the reduced network coverage area. The transmission relay component 635 may be configured as or otherwise support a means for communicating with a UE and a network entity of the network to relay transmissions between the UE and the network entity based on activating the relaying function.

In some examples, to support detecting that the network has transitioned from the first energy state mode to the second energy state mode, the control signaling component 640 may be configured as or otherwise support a means for receiving a control signal indicating the transition from the first energy state mode to the second energy state mode.

In some examples, the control signal includes one or more of a system information block, a master information block, or a message received over a backhaul link.

In some examples, the energy state mode indication component 645 may be configured as or otherwise support a means for transmitting an indication of the second energy state mode based on activating the relaying function.

In some examples, the energy state mode indication component 645 may be configured as or otherwise support a means for transmitting the indication of the second energy state mode in a sidelink synchronization signal block, a groupcast shared channel message, a sidelink control information message, a unicast medium access control control element (MAC-CE), or a unicast radio resource control message.

In some examples, the relay operation parameter component 650 may be configured as or otherwise support a means for receiving an indication of one or more relay operation parameters associated with the relay device, the one or more relay operation parameters including a power level, an indication of one or more beams, or both. In some examples, the relay operation parameter component 650 may be configured as or otherwise support a means for where communicating with the UE, the network entity, or both is based on the one or more relay operation parameters.

In some examples, the relaying function is activated at the relay device based on a distance between the relay device and the network entity.

In some examples, the relay function activation component 630 may be configured as or otherwise support a means for receiving a relay function activation message that indicates that the relay device is to activate the relaying function. In some examples, the relay function activation component 630 may be configured as or otherwise support a means for where activating the relaying function at the relay device based on receiving the relay function activation message.

In some examples, the relay availability component 655 may be configured as or otherwise support a means for transmitting, to the network entity and based on detecting that the network has transitioned from the first energy state mode to the second energy state mode, a relay availability message that indicates that the relay device is available to act as a relay and that a distance between the relay device and the network entity satisfies a distance threshold.

In some examples, the relay availability component 655 may be configured as or otherwise support a means for transmitting, to the UE and based on detecting that the network has transitioned from the first energy state mode to the second energy state mode, a relay availability message that indicates that the relay device is available to act as a relay.

In some examples, the energy state mode request component 660 may be configured as or otherwise support a means for receiving, from the UE, a request for an indication of a current energy state mode. In some examples, the energy state mode indication component 645 may be configured as or otherwise support a means for transmitting, to the UE, an indication of the second energy state mode.

Figure 7:
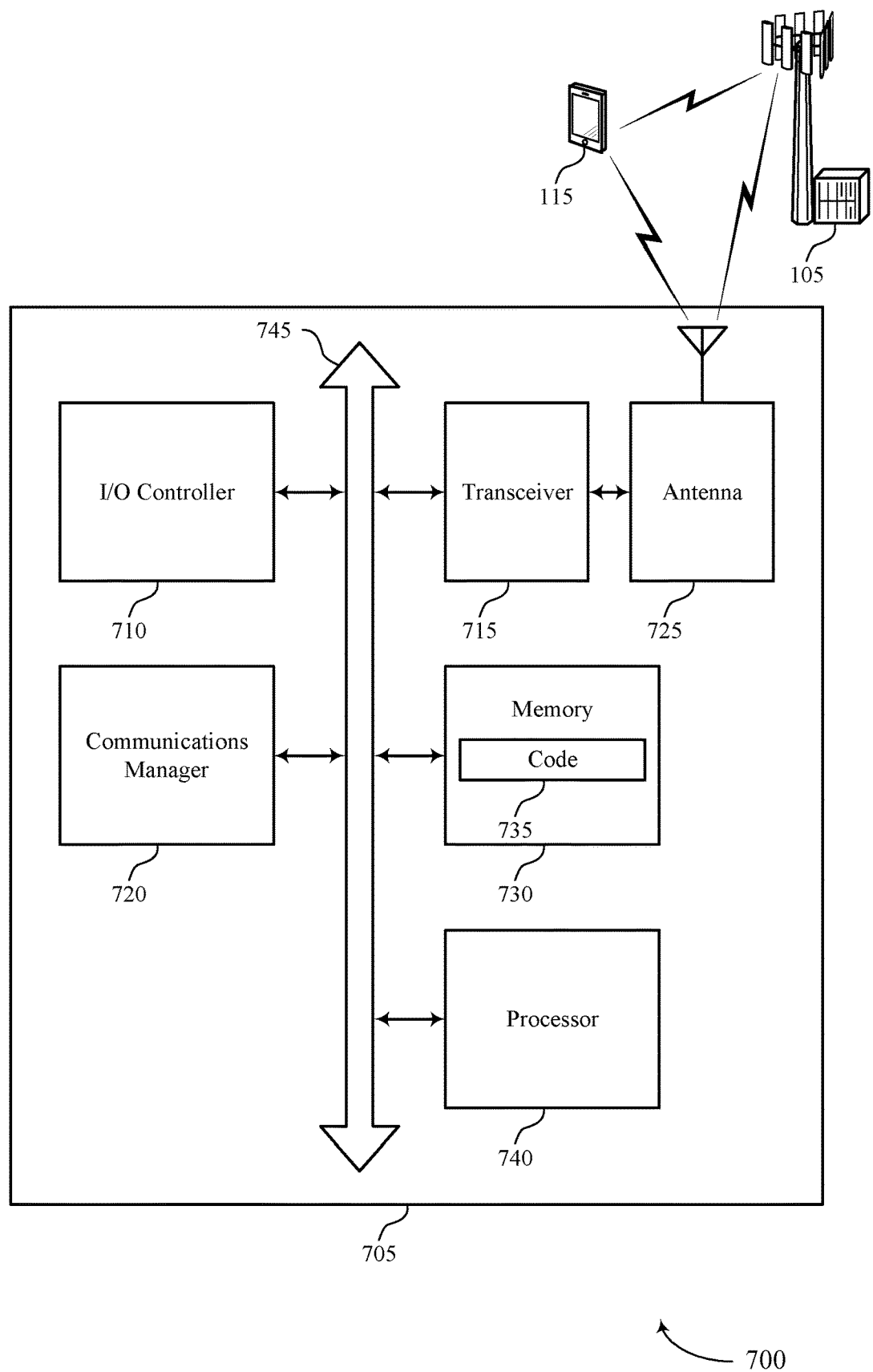
FIG. 7 shows a diagram of a system including a device that supports relay operation with energy state modes in accordance with one or more aspects of the present disclosure.

FIG. 7 shows a diagram of a system 700 including a device 705 that supports relay operation with energy state modes in accordance with one or more aspects of the present disclosure. The device 705 may be an example of or include the components of a device 405, a device 505, or a relay device as described herein. The device 705 may include components for bi-directional voice and data communications including components for transmitting and receiving communications, such as a communications manager 720, an I/O controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting relay operation with energy state modes). For example, the device 705 or a component of the device 705 may include a processor 740 and memory 730 coupled with or to the processor 740, the processor 740 and memory 730 configured to perform various functions described herein.

Additionally, or alternatively, the communications manager 720 may support wireless communication at a relay device in accordance with examples as disclosed herein. For example, the communications manager 720 may be configured as or otherwise support a means for detecting that a network has transitioned from a first energy state mode to a second energy state mode, where the second energy state mode is associated with a reduced network coverage area relative to a network coverage area associated with the first energy state mode. The communications manager 720 may be configured as or otherwise support a means for activating a relaying function at the relay device based on detecting that the network has transitioned to the second energy state mode and a location of the relay device with respect to the reduced network coverage area. The communications manager 720 may be configured as or otherwise support a means for communicating with a UE and a network entity of the network to relay transmissions between the UE and the network entity based on activating the relaying function.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of relay operation with energy state modes as described herein, or the processor 740 and the memory 730 may be otherwise configured to perform or support such operations.

Figure 8:
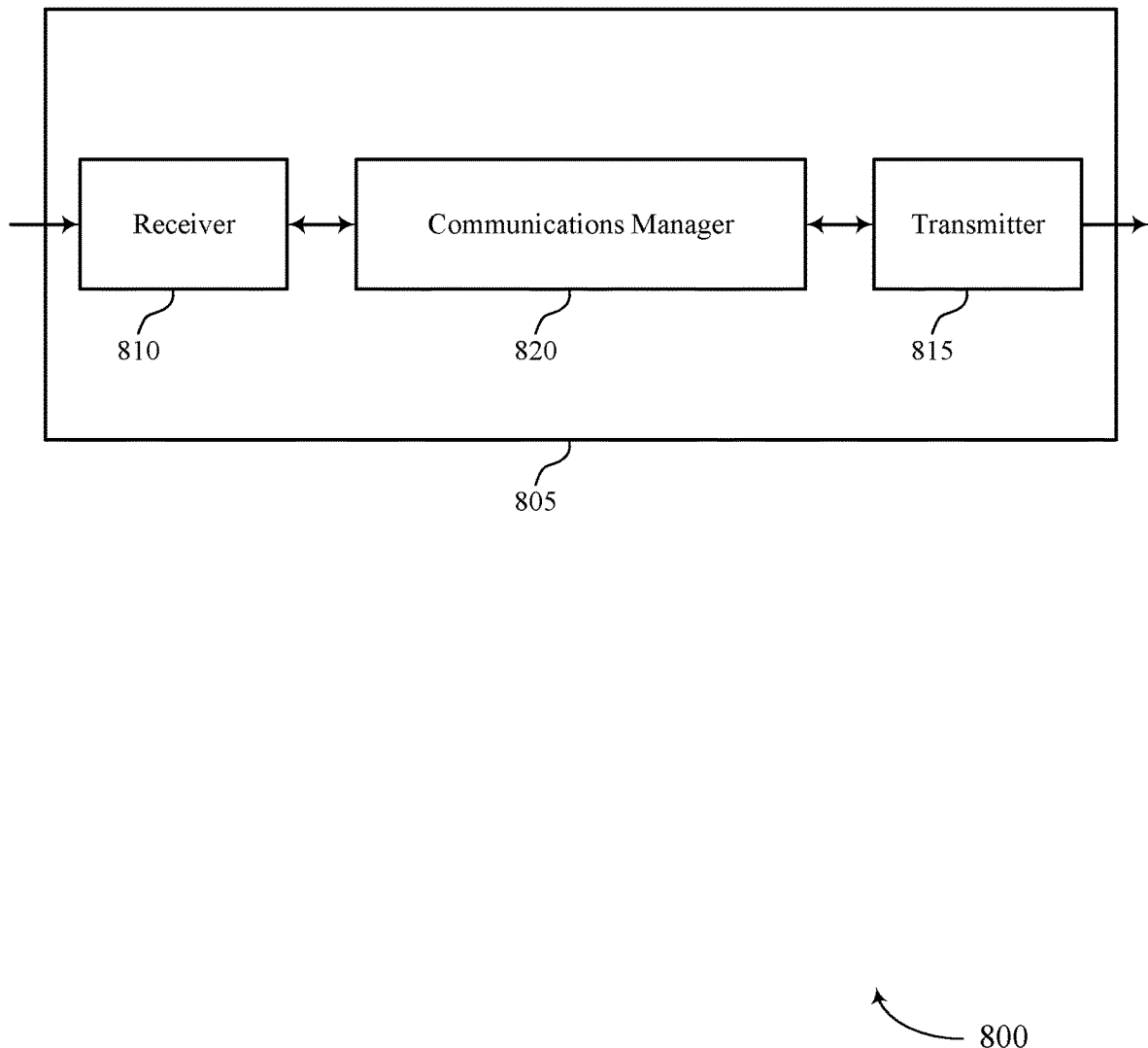
FIGS. 8 and 9 show block diagrams of devices that support relay operation with energy state modes in accordance with one or more aspects of the present disclosure.

FIG. 8 shows a block diagram 800 of a device 805 that supports relay operation with energy state modes in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of relay operation with energy state modes as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software) executed by a processor. If implemented in code executed by a processor, the functions of the communications manager 820, the receiver 810, the transmitter 815, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

Additionally, or alternatively, the communications manager 820 may support wireless communication at a network entity of a network in accordance with examples as disclosed herein. For example, the communications manager 820 may be configured as or otherwise support a means for detecting that the network has transitioned from a first energy state mode to a second energy state mode, where the second energy state mode is associated with a reduced network coverage area relative to a network coverage area of the first energy state mode. The communications manager 820 may be configured as or otherwise support a means for determining, based on a location of a relay device with respect to the reduced network coverage area, that the relay device has activated a relaying function. The communications manager 820 may be configured as or otherwise support a means for communicating with a UE via the relay device based on the determining.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, more efficient utilization of communication resources, or any combination thereof.

Figure 9:
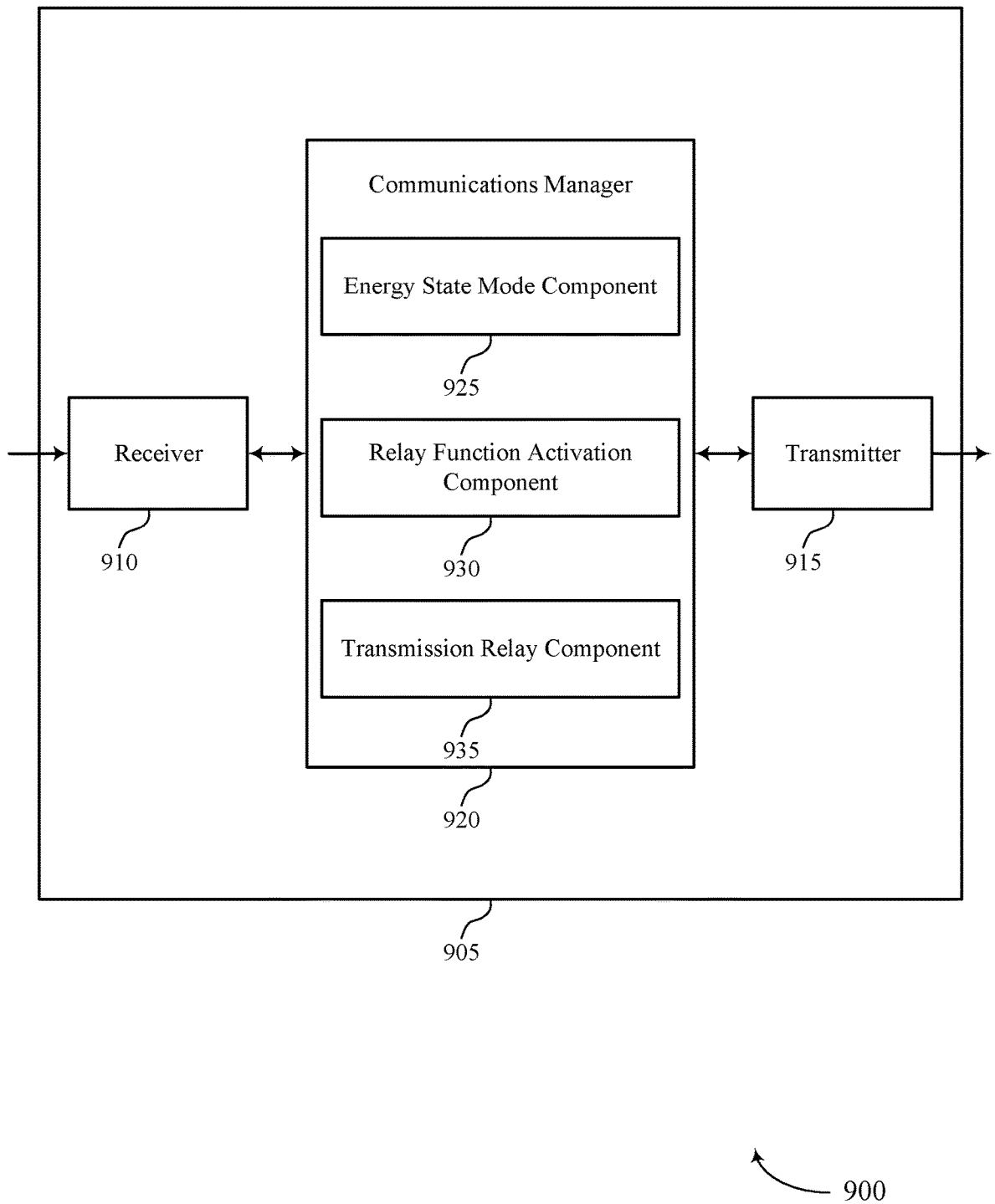

FIG. 9 shows a block diagram 900 of a device 905 that supports relay operation with energy state modes in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of relay operation with energy state modes as described herein. For example, the communications manager 920 may include an energy state mode component 925, a relay function activation component 930, a transmission relay component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity of a network in accordance with examples as disclosed herein. The energy state mode component 925 may be configured as or otherwise support a means for detecting that the network has transitioned from a first energy state mode to a second energy state mode, where the second energy state mode is associated with a reduced network coverage area relative to a network coverage area of the first energy state mode. The relay function activation component 930 may be configured as or otherwise support a means for determining, based on a location of a relay device with respect to the reduced network coverage area, that the relay device has activated a relaying function. The transmission relay component 935 may be configured as or otherwise support a means for communicating with a UE via the relay device based on the determining.

Figure 10:
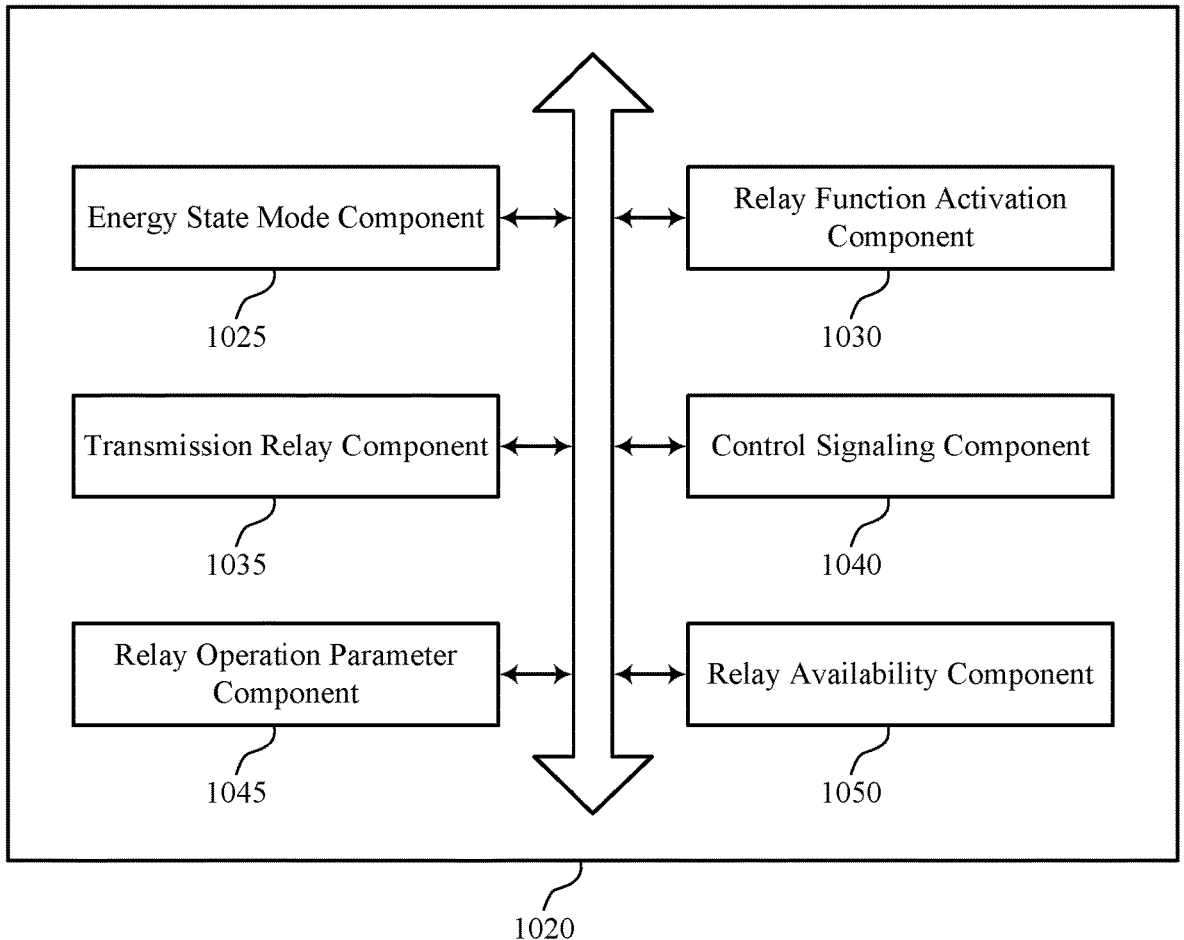
FIG. 10 shows a block diagram of a communications manager that supports relay operation with energy state modes in accordance with one or more aspects of the present disclosure.

FIG. 10 shows a block diagram 1000 of a communications manager 1020 that supports relay operation with energy state modes in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of relay operation with energy state modes as described herein. For example, the communications manager 1020 may include an energy state mode component 1025, a relay function activation component 1030, a transmission relay component 1035, a control signaling component 1040, a relay operation parameter component 1045, a relay availability component 1050, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1020 may support wireless communication at a network entity of a network in accordance with examples as disclosed herein. The energy state mode component 1025 may be configured as or otherwise support a means for detecting that the network has transitioned from a first energy state mode to a second energy state mode, where the second energy state mode is associated with a reduced network coverage area relative to a network coverage area of the first energy state mode. The relay function activation component 1030 may be configured as or otherwise support a means for determining, based on a location of a relay device with respect to the reduced network coverage area, that the relay device has activated a relaying function. The transmission relay component 1035 may be configured as or otherwise support a means for communicating with a UE via the relay device based on the determining.

In some examples, the control signaling component 1040 may be configured as or otherwise support a means for transmitting a control signal indicating the transition from the first energy state mode to the second energy state mode.

In some examples, the control signal includes one or more of a system information block, a master information block, or a message transmitted over a backhaul link.

In some examples, the relay operation parameter component 1045 may be configured as or otherwise support a means for transmitting an indication of one or more relay operation parameters associated with the relay device, the one or more relay operation parameters including a power level, an indication of one or more beams, or both.

In some examples, the relaying function is activated at the relay device based on a distance between the relay device and the network entity.

In some examples, the relay function activation component 1030 may be configured as or otherwise support a means for transmitting a relay function activation message that indicates that the relay device is to activate the relaying function. In some examples, the relay function activation component 1030 may be configured as or otherwise support a means for where the relay device activates the relaying function based on the relay function activation message.

In some examples, the relay availability component 1050 may be configured as or otherwise support a means for receiving, from the relay device, a relay availability message that indicates that the relay device is available to act as a relay and that a distance between the relay device and the network entity satisfies a distance threshold.

Figure 11:
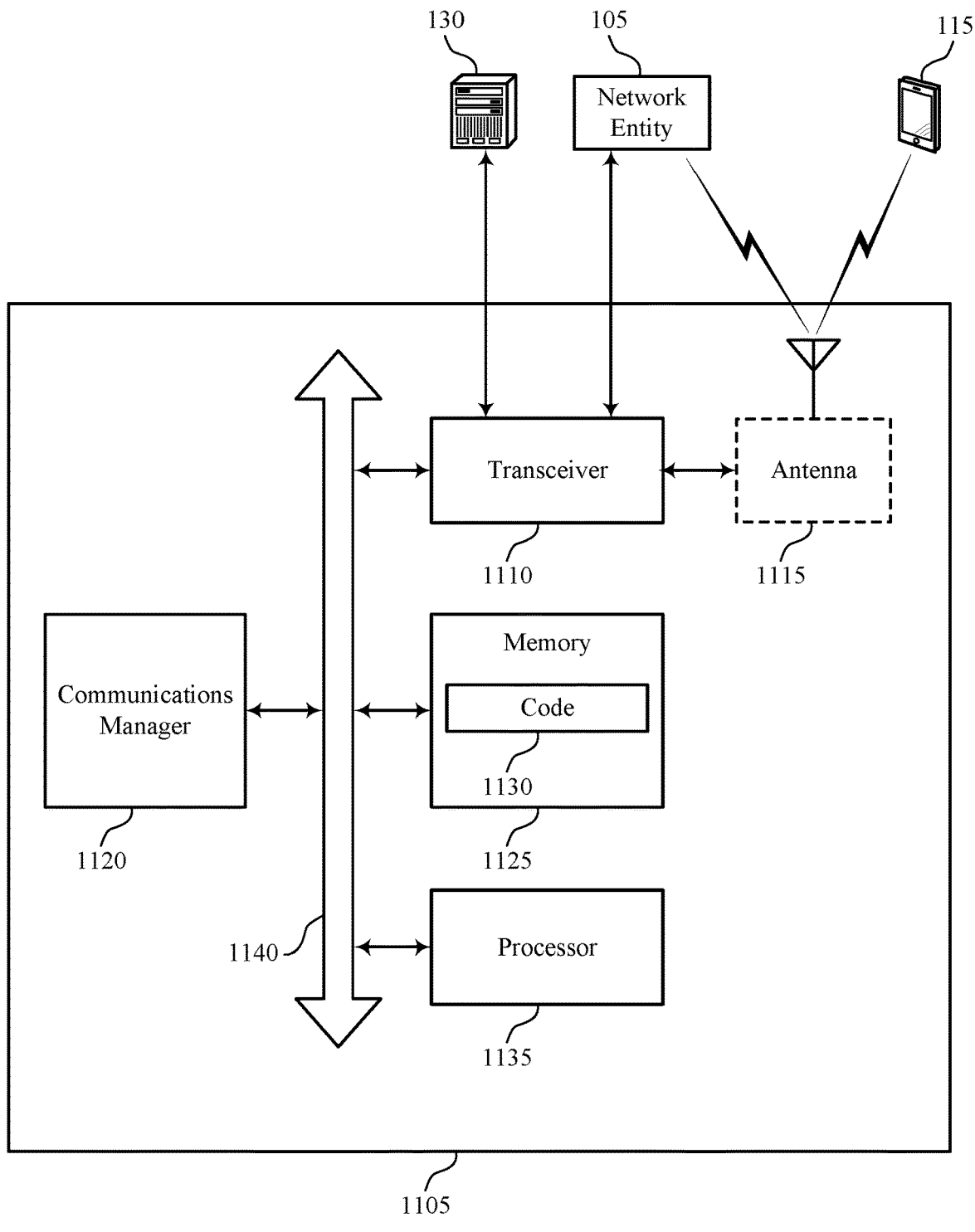
FIG. 11 shows a diagram of a system including a device that supports relay operation with energy state modes in accordance with one or more aspects of the present disclosure.

FIG. 11 shows a diagram of a system 1100 including a device 1105 that supports relay operation with energy state modes in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof.

The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting relay operation with energy state modes). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

Additionally, or alternatively, the communications manager 1120 may support wireless communication at a network entity of a network in accordance with examples as disclosed herein. For example, the communications manager 1120 may be configured as or otherwise support a means for detecting that the network has transitioned from a first energy state mode to a second energy state mode, where the second energy state mode is associated with a reduced network coverage area relative to a network coverage area of the first energy state mode. The communications manager 1120 may be configured as or otherwise support a means for determining, based on a location of a relay device with respect to the reduced network coverage area, that the relay device has activated a relaying function. The communications manager 1120 may be configured as or otherwise support a means for communicating with a UE via the relay device based on the determining.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of relay operation with energy state modes as described herein, or the processor 1135 and the memory 1125 may be otherwise configured to perform or support such operations.

Figure 12:
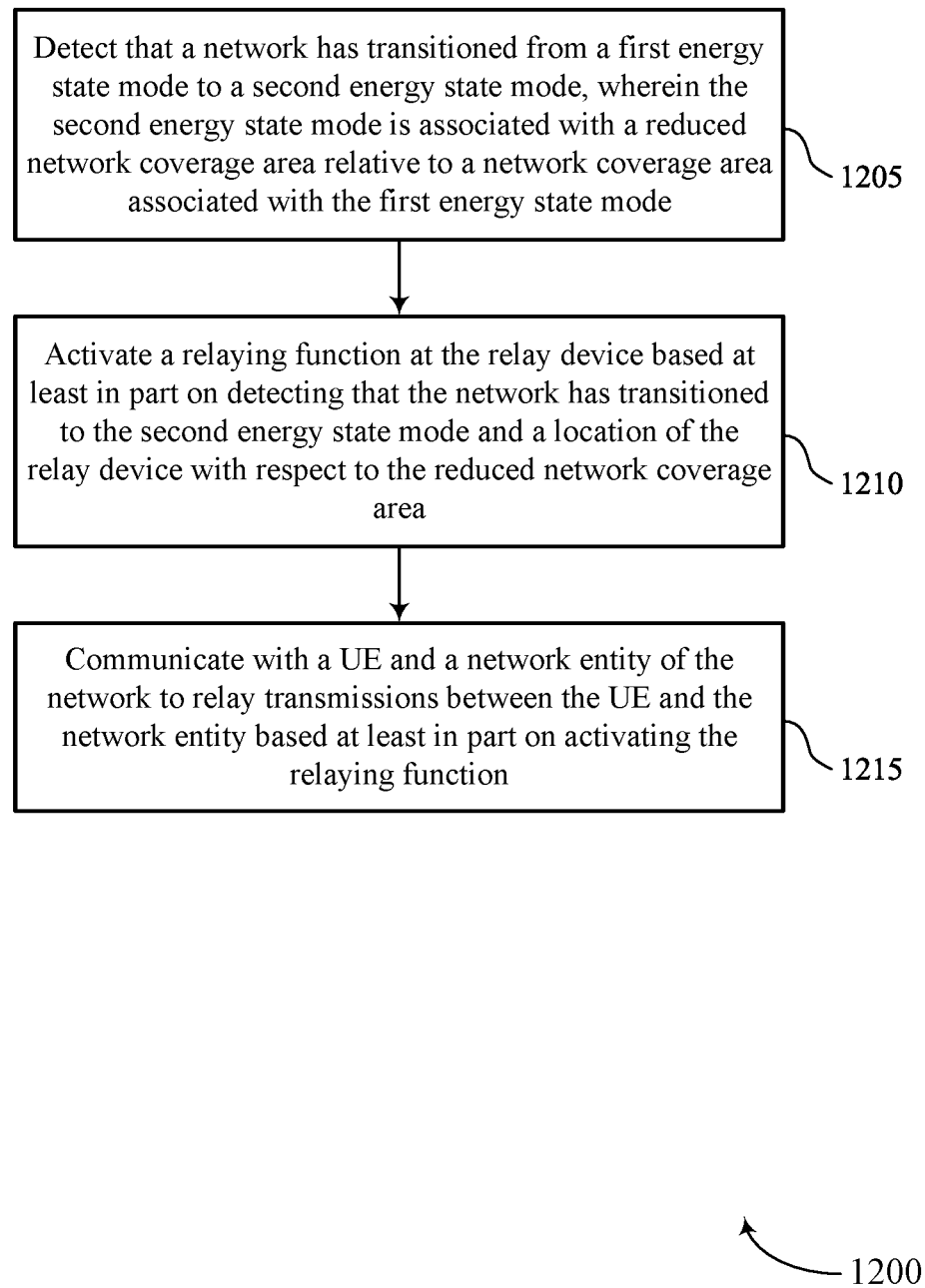
FIGS. 12 and 13 show flowcharts illustrating methods that support relay operation with energy state modes in accordance with one or more aspects of the present disclosure.

FIG. 12 shows a flowchart illustrating a method 1200 that supports relay operation with energy state modes in accordance with one or more aspects of the present disclosure. The operations of the method 1200 may be implemented by a relay device or its components as described herein. For example, the operations of the method 1200 may be performed by a relay device as described with reference to FIGS. 1 through 7. In some examples, a relay device may execute a set of instructions to control the functional elements of the relay device to perform the described functions. Additionally, or alternatively, the relay device may perform aspects of the described functions using special-purpose hardware.

At 1205, the method may include detecting that a network has transitioned from a first energy state mode to a second energy state mode, where the second energy state mode is associated with a reduced network coverage area relative to a network coverage area associated with the first energy state mode. The operations of 1205 may be performed in accordance with examples as disclosed herein. In some examples, aspects of the operations of 1205 may be performed by an energy state mode component 625 as described with reference to FIG. 6.

At 1210, the method may include activating a relaying function at the relay device based on detecting that the network has transitioned to the second energy state mode and a location of the relay device with respect to the reduced network coverage area. The operations of 1210 may be performed in accordance with examples as disclosed herein. In some examples, aspects of the operations of 1210 may be performed by a relay function activation component 630 as described with reference to FIG. 6.

At 1215, the method may include communicating with a UE and a network entity of the network to relay transmissions between the UE and the network entity based on activating the relaying function. The operations of 1215 may be performed in accordance with examples as disclosed herein. In some examples, aspects of the operations of 1215 may be performed by a transmission relay component 635 as described with reference to FIG. 6.

Figure 13:
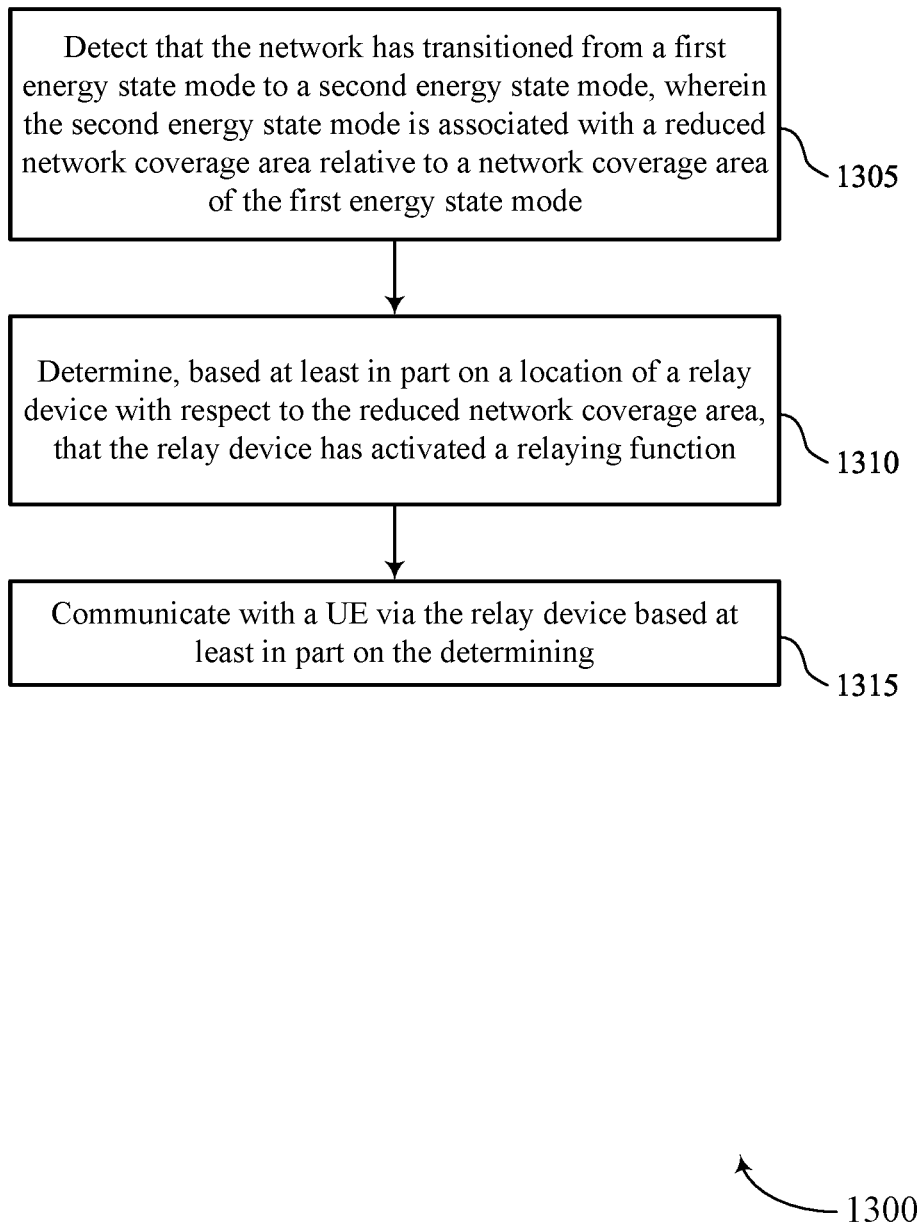

FIG. 13 shows a flowchart illustrating a method 1300 that supports relay operation with energy state modes in accordance with one or more aspects of the present disclosure. The operations of the method 1300 may be implemented by a network entity or its components as described herein. For example, the operations of the method 1300 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1305, the method may include detecting that the network has transitioned from a first energy state mode to a second energy state mode, where the second energy state mode is associated with a reduced network coverage area relative to a network coverage area of the first energy state mode. The operations of 1305 may be performed in accordance with examples as disclosed herein. In some examples, aspects of the operations of 1305 may be performed by an energy state mode component 1025 as described with reference to FIG. 10.

At 1310, the method may include determining, based on a location of a relay device with respect to the reduced network coverage area, that the relay device has activated a relaying function. The operations of 1310 may be performed in accordance with examples as disclosed herein. In some examples, aspects of the operations of 1310 may be performed by a relay function activation component 1030 as described with reference to FIG. 10.

At 1315, the method may include communicating with a UE via the relay device based on the determining. The operations of 1315 may be performed in accordance with examples as disclosed herein. In some examples, aspects of the operations of 1315 may be performed by a transmission relay component 1035 as described with reference to FIG. 10.

The following provides an overview of aspects of the present disclosure:

Aspect 1: A method for wireless communication at a relay device, comprising: detecting that a network has transitioned from a first energy state mode to a second energy state mode, wherein the second energy state mode is associated with a reduced network coverage area relative to a network coverage area associated with the first energy state mode; activating a relaying function at the relay device based at least in part on detecting that the network has transitioned to the second energy state mode and a location of the relay device with respect to the reduced network coverage area; and communicating with a UE and a network entity of the network to relay transmissions between the UE and the network entity based at least in part on activating the relaying function.

Aspect 2: The method of aspect 1, wherein detecting that the network has transitioned from the first energy state mode to the second energy state mode comprises: receiving a control signal indicating the transition from the first energy state mode to the second energy state mode.

Aspect 3: The method of aspect 2, wherein the control signal comprises one or more of a system information block, a master information block, or a message received over a backhaul link.

Aspect 4: The method of any of aspects 1 through 3, further comprising: transmitting an indication of the second energy state mode based at least in part on activating the relaying function.

Aspect 5: The method of aspect 4, further comprising: transmitting the indication of the second energy state mode in a sidelink synchronization signal block, a groupcast shared channel message, a sidelink control information message, a unicast medium access control control element, or a unicast radio resource control message.

Aspect 6: The method of any of aspects 1 through 5, further comprising: receiving an indication of one or more relay operation parameters associated with the relay device, the one or more relay operation parameters comprising a power level, an indication of one or more beams, or both; wherein communicating with the UE, the network entity, or both is based at least in part on the one or more relay operation parameters.

Aspect 7: The method of any of aspects 1 through 6, wherein the relaying function is activated at the relay device based at least in part on a distance between the relay device and the network entity.

Aspect 8: The method of any of aspects 1 through 7, further comprising: receiving a relay function activation message that indicates that the relay device is to activate the relaying function; wherein activating the relaying function at the relay device based at least in part on receiving the relay function activation message.

Aspect 9: The method of any of aspects 1 through 8, further comprising: transmitting, to the network entity and based at least in part on detecting that the network has transitioned from the first energy state mode to the second energy state mode, a relay availability message that indicates that the relay device is available to act as a relay and that a distance between the relay device and the network entity satisfies a distance threshold.

Aspect 10: The method of any of aspects 1 through 9, further comprising: transmitting, to the UE and based at least in part on detecting that the network has transitioned from the first energy state mode to the second energy state mode, a relay availability message that indicates that the relay device is available to act as a relay.

Aspect 11: The method of any of aspects 1 through 10, further comprising: receiving, from the UE, a request for an indication of a current energy state mode; and transmitting, to the UE, an indication of the second energy state mode.

Aspect 12: A method for wireless communication at a network entity of a network, comprising: detecting that the network has transitioned from a first energy state mode to a second energy state mode, wherein the second energy state mode is associated with a reduced network coverage area relative to a network coverage area of the first energy state mode; determining, based at least in part on a location of a relay device with respect to the reduced network coverage area, that the relay device has activated a relaying function; and communicating with a UE via the relay device based at least in part on the determining.

Aspect 13: The method of aspect 12, further comprising: transmitting a control signal indicating the transition from the first energy state mode to the second energy state mode.

Aspect 14: The method of aspect 13, wherein the control signal comprises one or more of a system information block, a master information block, or a message transmitted over a backhaul link.

Aspect 15: The method of any of aspects 12 through 14, further comprising: transmitting an indication of one or more relay operation parameters associated with the relay device, the one or more relay operation parameters comprising a power level, an indication of one or more beams, or both.

Aspect 16: The method of any of aspects 12 through 15, wherein the relaying function is activated at the relay device based at least in part on a distance between the relay device and the network entity.

Aspect 17: The method of any of aspects 12 through 16, further comprising: transmitting a relay function activation message that indicates that the relay device is to activate the relaying function; wherein the relay device activates the relaying function based at least in part on the relay function activation message.

Aspect 18: The method of any of aspects 12 through 17, further comprising: receiving, from the relay device, a relay availability message that indicates that the relay device is available to act as a relay and that a distance between the relay device and the network entity satisfies a distance threshold.

Aspect 19: An apparatus for wireless communication at a relay device, comprising a processor; memory coupled with the processor; and instructions stored in the memory and executable by the processor to cause the apparatus to perform a method of any of aspects 1 through 11.

Aspect 20: An apparatus for wireless communication at a relay device, comprising at least one means for performing a method of any of aspects 1 through 11.

Aspect 21: A non-transitory computer-readable medium storing code for wireless communication at a relay device, the code comprising instructions executable by a processor to perform a method of any of aspects 1 through 11.

Aspect 22: An apparatus for wireless communication at a network entity of a network, comprising a processor; memory coupled with the processor; and instructions stored in the memory and executable by the processor to cause the apparatus to perform a method of any of aspects 12 through 18.

Aspect 23: An apparatus for wireless communication at a network entity of a network, comprising at least one means for performing a method of any of aspects 12 through 18.

Aspect 24: A non-transitory computer-readable medium storing code for wireless communication at a network entity of a network, the code comprising instructions executable by a processor to perform a method of any of aspects 12 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, etc., whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a relay device, comprising:
   a processor;
   memory coupled with the processor; and
   instructions stored in the memory and executable by the processor to cause the relay device to:
      detect that a network has transitioned from a first energy state mode to a second energy state mode, wherein the second energy state mode is associated with a reduced network coverage area relative to a network coverage area associated with the first energy state mode;
      activate a relaying function at the relay device based at least in part on detecting that the network has transitioned to the second energy state mode and a location of the relay device with respect to the reduced network coverage area; and
      communicate with a user equipment (UE) and a network entity of the network to relay transmissions between the UE and the network entity based at least in part on activating the relaying function.

2. The apparatus of claim 1, wherein the instructions to detect that the network has transitioned from the first energy state mode to the second energy state mode are executable by the processor to cause the relay device to:
   receive a control signal indicating the transition from the first energy state mode to the second energy state mode.

3. The apparatus of claim 2, wherein the control signal comprises one or more of a system information block, a master information block, or a message received over a backhaul link.

4. The apparatus of claim 1, wherein the instructions are further executable by the processor to cause the relay device to:
   transmit an indication of the second energy state mode based at least in part on activating the relaying function.

5. The apparatus of claim 4, wherein the instructions are further executable by the processor to cause the relay device to:
   transmit the indication of the second energy state mode in a sidelink synchronization signal block, a groupcast shared channel message, a sidelink control information message, a unicast medium access control (MAC) control element (MAC-CE), or a unicast radio resource control message.

6. The apparatus of claim 1, wherein the instructions are further executable by the processor to cause the relay device to:
   receive an indication of one or more relay operation parameters associated with the relay device, the one or more relay operation parameters comprising a power level, an indication of one or more beams, or both;
   wherein communicating with the UE, the network entity, or both is based at least in part on the one or more relay operation parameters.

7. The apparatus of claim 1, wherein the relaying function is activated at the relay device based at least in part on a distance between the relay device and the network entity.

8. The apparatus of claim 1, wherein the instructions are further executable by the processor to cause the relay device to:
   receive a relay function activation message that indicates that the relay device is to activate the relaying function;
   wherein activating the relaying function at the relay device is based at least in part on receiving the relay function activation message.

9. The apparatus of claim 1, wherein the instructions are further executable by the processor to cause the relay device to:
   transmit, to the network entity and based at least in part on detecting that the network has transitioned from the first energy state mode to the second energy state mode, a relay availability message that indicates that the relay device is available to act as a relay and that a distance between the relay device and the network entity satisfies a distance threshold.

10. The apparatus of claim 1, wherein the instructions are further executable by the processor to cause the relay device to:
transmit, to the UE and based at least in part on detecting that the network has transitioned from the first energy state mode to the second energy state mode, a relay availability message that indicates that the relay device is available to act as a relay.

11. The apparatus of claim 1, wherein the instructions are further executable by the processor to cause the relay device to:
receive, from the UE, a request for an indication of a current energy state mode; and
transmit, to the UE, an indication of the second energy state mode.

12. An apparatus for wireless communication at a network entity of a network, comprising:
a processor;
memory coupled with the processor; and
instructions stored in the memory and executable by the processor to cause the network entity to:
detect that the network has transitioned from a first energy state mode to a second energy state mode, wherein the second energy state mode is associated with a reduced network coverage area relative to a network coverage area of the first energy state mode;
determine, based at least in part on a location of a relay device with respect to the reduced network coverage area, that the relay device has activated a relaying function; and
communicate with a user equipment (UE) via the relay device based at least in part on the determining.

13. The apparatus of claim 12, wherein the instructions are further executable by the processor to cause the network entity to:
transmit a control signal indicating the transition from the first energy state mode to the second energy state mode.

14. The apparatus of claim 13, wherein the control signal comprises one or more of a system information block, a master information block, or a message transmitted over a backhaul link.

15. The apparatus of claim 12, wherein the instructions are further executable by the processor to cause the network entity to:
transmit an indication of one or more relay operation parameters associated with the relay device, the one or more relay operation parameters comprising a power level, an indication of one or more beams, or both.

16. The apparatus of claim 12, wherein the relaying function is activated at the relay device based at least in part on a distance between the relay device and the network entity.

17. The apparatus of claim 12, wherein the instructions are further executable by the processor to cause the network entity to:
transmit a relay function activation message that indicates that the relay device is to activate the relaying function;
wherein the relay device activates the relaying function based at least in part on the relay function activation message.

18. The apparatus of claim 12, wherein the instructions are further executable by the processor to cause the network entity to:
receive, from the relay device, a relay availability message that indicates that the relay device is available to act as a relay and that a distance between the relay device and the network entity satisfies a distance threshold.

19. A method for wireless communication at a relay device, comprising:
detecting that a network has transitioned from a first energy state mode to a second energy state mode, wherein the second energy state mode is associated with a reduced network coverage area relative to a network coverage area associated with the first energy state mode;
activating a relaying function at the relay device based at least in part on detecting that the network has transitioned to the second energy state mode and a location of the relay device with respect to the reduced network coverage area; and
communicating with a user equipment (UE) and a network entity of the network to relay transmissions between the UE and the network entity based at least in part on activating the relaying function.

20. The method of claim 19, wherein detecting that the network has transitioned from the first energy state mode to the second energy state mode comprises:
receiving a control signal indicating the transition from the first energy state mode to the second energy state mode.

21. The method of claim 19, further comprising:
transmitting an indication of the second energy state mode based at least in part on activating the relaying function.

22. The method of claim 19, further comprising:
receiving an indication of one or more relay operation parameters associated with the relay device, the one or more relay operation parameters comprising a power level, an indication of one or more beams, or both;
wherein communicating with the UE, the network entity, or both is based at least in part on the one or more relay operation parameters.

23. The method of claim 19, further comprising:
receiving a relay function activation message that indicates that the relay device is to activate the relaying function;
wherein activating the relaying function at the relay device based at least in part on receiving the relay function activation message.

24. The method of claim 19, further comprising:
transmitting, to the UE and based at least in part on detecting that the network has transitioned from the first energy state mode to the second energy state mode, a relay availability message that indicates that the relay device is available to act as a relay.

25. The method of claim 19, further comprising:
receiving, from the UE, a request for an indication of a current energy state mode; and
transmitting, to the UE, an indication of the second energy state mode.

26. A method for wireless communication at a network entity of a network, comprising:
detecting that the network has transitioned from a first energy state mode to a second energy state mode, wherein the second energy state mode is associated with a reduced network coverage area relative to a network coverage area of the first energy state mode;
determining, based at least in part on a location of a relay device with respect to the reduced network coverage area, that the relay device has activated a relaying function; and communicating with a user equipment (UE) via the relay device based at least in part on the determining.

27. The method of claim 26, further comprising:
transmitting a control signal indicating the transition from the first energy state mode to the second energy state mode.

28. The method of claim 26, further comprising:
transmitting an indication of one or more relay operation parameters associated with the relay device, the one or more relay operation parameters comprising a power level, an indication of one or more beams, or both.

29. The method of claim 26, further comprising:
transmitting a relay function activation message that indicates that the relay device is to activate the relaying function;
wherein the relay device activates the relaying function based at least in part on the relay function activation message.

30. The method of claim 26, further comprising:
receiving, from the relay device, a relay availability message that indicates that the relay device is available to act as a relay and that a distance between the relay device and the network entity satisfies a distance threshold.

* * * * *